July 27, 1937.  J. C. McCUNE  2,088,528
RETARDATION CONTROLLED BRAKE
Filed May 2, 1935  2 Sheets-Sheet 1
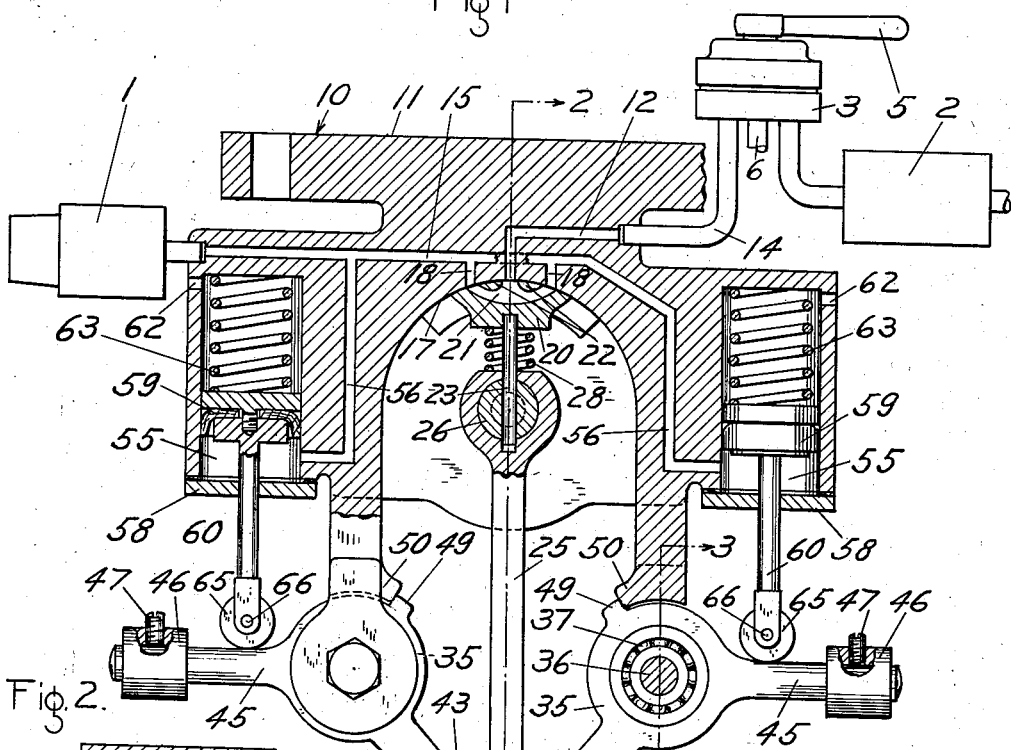
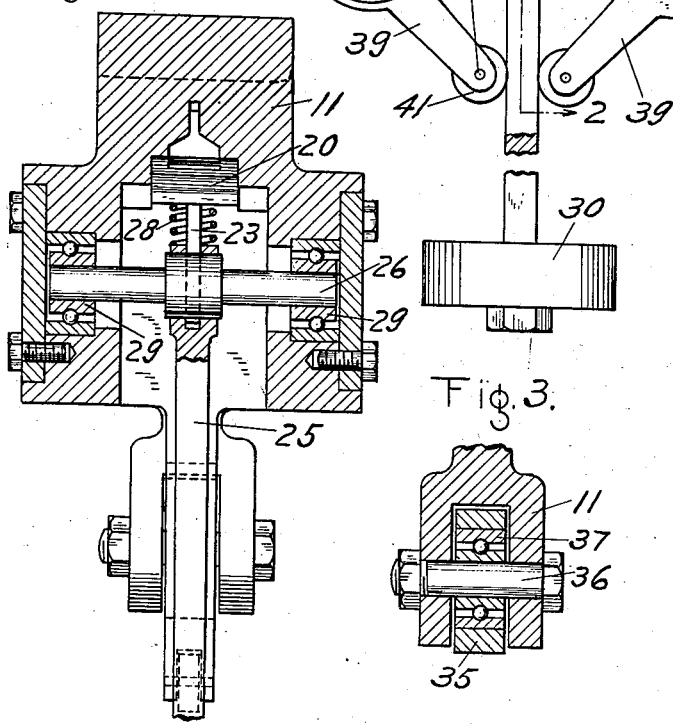
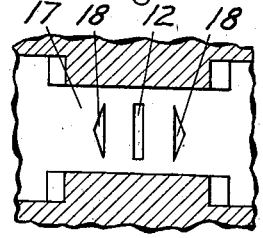
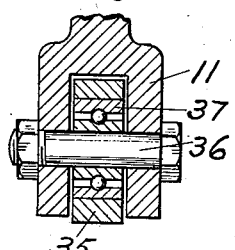
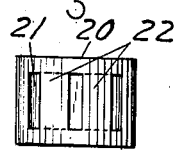
INVENTOR
JOSEPH C. McCUNE
BY Wm. H. Cady
ATTORNEY July 27, 1937.                    J. C. McCUNE                    2,088,528
                        RETARDATION CONTROLLED BRAKE
                           Filed May 2, 1935          2 Sheets-Sheet 2
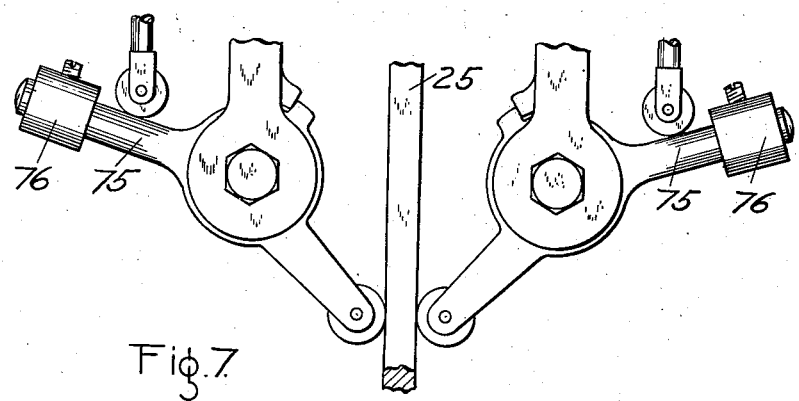
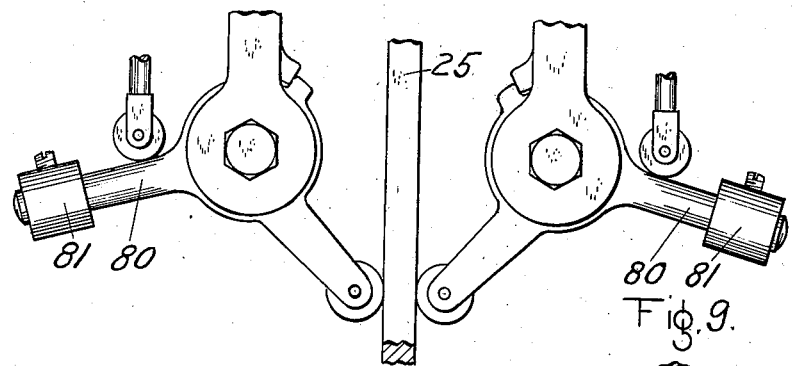
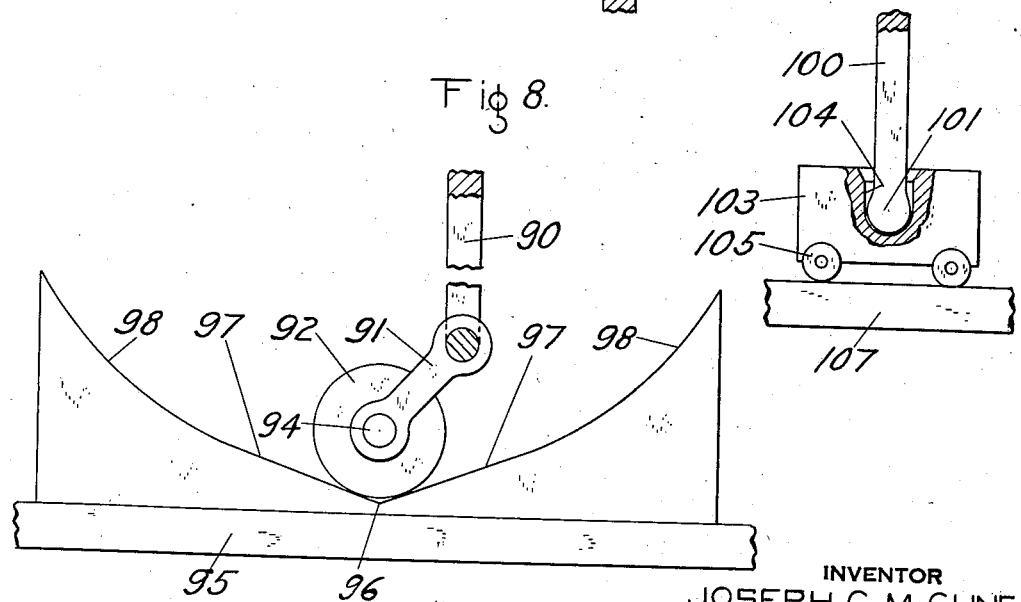
INVENTOR
JOSEPH C. McCUNE
BY Wm. N. Cady
ATTORNEY Patented July 27, 1937

2,088,528

UNITED STATES PATENT OFFICE 2,088,528

RETARDATION CONTROLLED BRAKE

Joseph C. McCune, Edgewood, Pa., assignor to The Westinghouse Air Brake Company, Wilmerding, Pa., a corporation of Pennsylvania Application May 2, 1935, Serial No. 19,374

13 Claims. (Cl. 303—24)

This invention relates to vehicle brakes and more particularly to means for controlling the degree of application of the brakes to automatically regulate the rate of retardation of the vehicle.

Various devices have been developed to automatically vary the degree of application of the brakes, and a common type of such apparatus employs a pendulum which is movable in accordance with the rate of retardation of the vehicle, movement of the pendulum being opposed by springs.

The devices now in use have freely swinging pendulums or freely moving weighted bodies, and, while these are checked or snubbed by springs or similar means, the pendulum or the weighted bodies oscillate due to vibration and movements of the vehicle as it runs along the track, thereby subjecting the bearings on which the pendulum is supported, and the mechanism associated with the pendulum or the weighted bodies to excessive wear.

It is the principal object of this invention to provide a retardation control apparatus adapted for use on railway vehicles and having a member movable in accordance with the rate of retardation of the vehicle, together with means other than springs opposing movement of the member movable in accordance with the rate of retardation of the vehicle.

Another object of the invention is to provide a retardation control apparatus adapted for use on railway vehicles and having a member responsive to inertia, together with means responsive to gravity to control the movement of the inertia-responsive member.

A further object of the invention is to provide a retardation control apparatus adapted for use on railway vehicles and having a member movable in accordance with the rate of retardation of the vehicle and having control means associated therewith for controlling the vehicle braking means, the control means being arranged so that the degree of application of the brakes varies at a rate different than the rate of change in the position of the member movable according to the rate of retardation of the vehicle.

Another object of the invention is to provide retardation control apparatus adapted for use on a railway vehicle and having a member movable in accordance with the rate of retardation of the vehicle, together with means opposing movement of the member movable in accordance with the rate of retardation of the vehicle and means for rendering the last-named means ineffective.

A further object of the invention is to provide retardation control apparatus adapted for use on a railway vehicle and having a member responsive to inertia, together with means to maintain the inertia-responsive member in a normal or inoperative position and means for rendering the last-named means ineffective.

Another object of the invention is to provide a retardation control apparatus adapted for use on a railway vehicle and having a member responsive to inertia for controlling the degree of application of the brakes, the apparatus being operable to control the brakes in response to a reduction in the speed of the vehicle when moving in either direction, and having means to maintain the apparatus inoperative until a predetermined dgree of application of the brakes is secured, whereby during acceleration of the vehicle the retardation control apparatus will not move to a position to open the release passage leading from the brake cylinder and thereby render the brakes inoperative.

A further object of the invention is to provide an improved retardation control apparatus adapted for use on railway vehicles.

Other objects of the invention and features of novelty will be apparent from the following description taken in connection with the accompanying drawings in which Fig. 1 is a diagrammatic view of one embodiment of the vehicle brake equipment provided by my invention;

Fig. 2 is a sectional view taken substantially along the line 2—2 of Fig. 1;

Fig. 3 is a fragmentary sectional view taken substantially along the line 3—3 of Fig. 1;

Fig. 4 is a fragmentary bottom plan view of the slide valve seat employed in the brake equipment shown in Fig. 1;

Fig. 5 is a top plan view of the slide valve employed in the brake equipment shown in Fig. 1;

Fig. 6 is a fragmentary view showing a different arrangement of gravity-responsive means which I may employ to control the movement of the inertia-responsive member;

Fig. 7 is a fragmentary view showing another arrangement of gravity-responsive means which I may employ to control the movement of the inertia-responsive member; and Figs. 8 and 9 are fragmentary views showing modified forms of inertia-responsive members which I may employ.

Referring to the drawings, and more particularly to Fig. 1 thereof, the numeral 1 indicates the brake cylinder of a fluid pressure brake that is supplied with fluid under pressure from the reservoir 2 by the operation of the brake valve 3 upon movement of the brake valve handle 5 to an application position in a well known manner. The brake valve handle 5 is also movable to a release position in which fluid is released from the brake cylinder 1 through the exhaust pipe 6.

The supply of fluid to and the release of fluid from the brake cylinder 1 is also controlled by means of the inertia controlled valve device provided by my invention and indicated generally by the reference character 10.

As shown in the drawings the valve device 10 comprises a body 11, which may be secured to the vehicle in any suitable manner, and which has a pasage 12 formed therein and communicating with a pipe 14 leading from the brake valve 3. The body 11 also has a passage 15 formed therein which communicates with the brake cylinder 1. The passage 12 communicates with a port in the arcuate slide valve seat 17 which is formed in the body 11, while the passage 15 communicates with a pair of ports 18 in the slide valve seat 17, which ports are located on opposite sides of the port associated with the passage 12.

The ports 18 are preferably substantially triangular in shape, the base of the triangle being positioned adjacent a port 12, as is best shown in Fig. 4 of the drawings. The purpose of this arrangement will be explained in detail below.

The valve device also includes a rotary slide valve 20 which is reciprocally movable upon the arcuate slide valve seat 17 and has a cavity or passage 21 formed therein which communicates with ports on the face of the rotary slide valve 20, the ports being separated by intermediate wall portions 22, as is best shown in Figs. 1 and 5 of the drawings.

The slide valve 20 is secured on the end of a stem 23 which is positioned in aligned apertures in the upper end of the arm 25 and the shaft 26. A spring 28 is positioned between the slide valve 20 and the end of the arm 25 and normally urges the slide valve 20 into engagement with the seat 17.

The shaft 26 is rotatably supported from the body 11 by means of anti-friction bearings 29 as is clearly shown in Fig. 2 of the drawings.

The arm 25 has a weight 30 secured on the lower end thereof so as to be suspended from the shaft 26. The arm 25 and the weight 30 together constitute a pendulum or inertia responsive member which is movable in response to changes in the rate of speed of the vehicle. As will be understood, the valve device 10 is secured on the vehicle in such a manner that the pendulum or inertia responsive member is movable in a plane extending generally longitudinally of the vehicle.

When the pendulum moves about the axis on which it is oscillatable the rotary slide valve 20, being connected to the pendulum by means of the pin or stem 23, is moved relative to the slide valve seat 17 so as to cut off or to open communication through the ports 12 and 18.

The valve device provided by this invention has means associated with the pendulum or inertia-responsive member and operable to control the movements of this member. Identical means are employed to control movement of the pendulum away from the normal position in either direction, and each of these means comprises a bell crank 35 rotatably supported on the body 11 by means of pin 36 and an anti-friction bearing 37.

Each of the bell cranks 35 has an arm 39 associated therewith and has a roller 41 rotatably supported in the end thereof on a pin 43. The arm 39 preferably projects downwardly from the hub portion of the bell crank 35 so that the roller 41 engages the arm 25 at a point vertically below the axis on which the bell crank 35 oscillates.

Each of the bell cranks 35 has, in addition, an arm 45 associated therewith and extending in a generally horizontal direction when the pendulum arm 25 is in the normal position. The arm 45 has a weight 46 secured thereon by means of a set screw or similar securing means 47 so that the weight 46 may be adjustably positioned on the arm.

Each of the bell cranks 35 has a projecting portion 49 formed thereon and engageable with a stop 50 formed on the valve body 11 to limit movement of the bell crank by the weight 46.

The projections 49 and the stops 50 are preferably arranged so that the projections 49 move into engagement with the stops 50 and thereby limit rotation of the bell cranks 35 substantially at the time that the pendulum or inertia responsive member is moved to the normal position, that is, to the position in which it is shown in Fig. 1 of the drawings.

When the pendulum or inertia responsive member moves away from the normal position it causes one of the bell cranks 35 to rotate on the bearing on which it is supported, with the result that the weight 46 associated with this bell crank is lifted or moved upwardly against the force of gravity. The other bell crank is held by the cooperating projection and stop means associated with this bell crank. As movement of the pendulum is opposed by the weight 46 it moves a smaller distance than it would move otherwise, and the weight 46 acting through the bell crank 35 exerts a force on the pendulum urging it towards the normal position.

The arrangement of the projection 49 on the bell crank 35 and the stop 50 on the body 11, by means of which the bell cranks are prevented from moving the pendulum beyond the normal position, prevents the weights from opposing or offsetting each other and insures that the pendulum will always be under the control of one of these members.

The valve device provided by my invention has means for controlling the bell cranks 35 and operable to prevent movement of the bell cranks 35 and of the pendulum device, and to maintain the pendulum device in the normal position except during an application of the brakes. As shown in the drawings the body 11 has a pair of piston chambers 55 formed therein which communicates by way of passages 56 with the passage 15 associated with the brake cylinder 1. The lower end of each of the piston chambers 55 is closed by means of a cover plate 58, while each of the piston chambers has a piston 59 mounted therein. The pistons 59 each have a stem 60 associated therewith which projects through an opening in the plate 58. The stems 60 tightly fit in the openings in the plates 58 so as to prevent the escape of fluid under pressure from the piston chambers 55 to the atmosphere. The upper ends of the piston chambers 55 are connected to the atmosphere by way of the passages 62, while springs 63 are interposed between the heads of the pistons 59 and the upper ends of the piston chambers 55 and normally urge the pistons 59 downwardly.

The lower end of each of the stems 60 has a roller 65 rotatably secured thereon on a pin 66. The rollers 65 are adapted to engage the arms 45 on the bell crank 35 and when the pistons 59 are urged downwardly by the springs 63 the bell cranks 35 will be rotated so that the projections 49 on the bell cranks will be moved into engagement with the stops 50, while each of these bell cranks will urge the pendulum to the normal position, and, as the pendulum is held from opposite sides, it is prevented from moving away from the normal position. This arrangement prevents movement of the bell cranks 35 and the pendulum while the train is running along a track with the brakes released.

When fluid under pressure is supplied to the brake cylinder 1 fluid also flows by way of the passages 56 to the piston chambers 55, and on a predetermined increase in the pressure of the fluid in the brake cylinder the pistons 59 will be forced upwardly against the springs 63, thereby moving the rollers 65 out of engagement with the arms 45. This permits the arms 45 and the bell cranks 35 to be moved by the pendulum with the result that on an application of the brakes the inertia controlled valve device is conditioned to control the pressure of the fluid in the brake cylinder.

Similarly, when the pressure of the fluid in the brake cylinder 1 is reduced below a predetermined value the springs 63 move the pistons 59 downwardly and cause the rollers 65 to again engage the arms 45 and move the bell cranks 35 so that the pendulum is held in the normal position and the inertia responsive valve device no longer controls the degree of application of the brakes.

In the operation of the brake equipment provided by my invention, assuming that the vehicle is moving at a substantial speed, when it is desired to apply the brakes fluid under pressure is supplied to the brake cylinder 1 from the reservoir 2 by operation of the handle 5 of the brake valve 3. This permits fluid to flow from the reservoir 2 to the brake cylinder 1 by way of the pipe 14, passage 12, the cavity 21 in the slide valve 20, ports 18 and the passage 15. Fluid under pressure is also supplied to the piston chambers 55 by way of the passages 56. The supply of fluid under pressure to the brake cylinder causes the brakes to be applied and results in a reduction in the speed of the vehicle. As soon as the pressure of the fluid in the brake cylinder 1 increases to a predetermined value the increase in the pressure of the fluid in the piston chambers 55 causes the pistons 59 to be moved upwardly so that the rollers 65 are disengaged from the arms 45.

On a reduction in the speed of the vehicle the pendulum associated with the valve device provided by my invention will be caused to move away from the normal position, the extent of its movement being dependent upon the rate of retardation of the vehicle. When the pendulum moves away from the normal position the slide valve 20 is moved relative to the slide valve seat 17, and on a predetermined amount of movement of the slide valve 20, an intermediate wall portion 22 of the slide valve is moved to a position to cut off the flow of fluid through the passage 12 leading from the brake valve 3. This causes the brakes to be lapped.

If the rate of retardation of the vehicle should exceed a desired predetermined value, as determined by the position of the weight 46 on arm 45, the pendulum will move a greater distance away from the normal position resulting in a greater movement of the slide valve 20 on the valve seat 17 and causing the end wall portion of the slide valve 20 to be moved to a position to uncover a port 18 leading from the passage 15, so that fluid under pressure is permitted to escape from the brake cylinder to the atmosphere. The portions 22 are of sufficient width to maintain the passage 12 closed during this further movement of the slide valve. This results in a reduction in the pressure of the fluid in the brake cylinder 1 and in the degree of application of the brakes. This effects a reduction in the rate of retardation of the vehicle with the result that the pendulum moves toward the normal position to cut off the release of fluid from the brake cylinder.

If the rate of retardation of the vehicle again exceeds the predetermined value the pendulum will again move away from the normal position so as to again move the slide valve 20 to a position to permit the release of fluid from the brake cylinder 1 and further reduce the degree of application of the brakes.

If the rate of reduction of the speed of the vehicle is reduced to a relatively low value, the pendulum will move towards the normal position so that the release of fluid from the brake cylinder is cut off, and so that the intermediate wall portion 22 of the slide valve 20 no longer laps but opens the passage 12, and fluid under pressure will again be supplied to the brake cylinder from the reservoir 2, assuming, of course, that the brake valve handle 5 is still in the application position.

This results in an increase in the degree of application of the brakes and a similar increase in the rate of retardation of the vehicle, and if this rate is increased to a sufficient value the pendulum will again move to a position to move the slide valve to lap the flow of fluid to the brake cylinder, or to permit the release of fluid from the brake cylinder so as to maintain the desired rate of retardation of the vehicle.

As is best shown in Fig. 4 of the drawings the ports 18 are substantially triangular in shape, the base of the triangle being positioned adjacent the supply port 12. Because of this arrangement of the port, in releasing fluid under pressure from the brake cylinder, the apex of the triangle will be uncovered by the slide valve first, and on further movement of the slide valve the portions remote from the apex of the triangle will be uncovered with the result that the size of the exhaust port uncovered, and hence the rate at which fluid is released from the brake cylinder, will be relatively small when the desired rate of retardation is reached, but will be increased very rapidly if this rate of retardation is exceeded.

If, therefore, the desired retardation rate is exceeded fluid will be released from the brake cylinder very quickly so as to reduce the pressure in the brake cylinder very rapidly and thus prevent wheel sliding.

When the rate of retardation of the vehicle is reduced due to the release of the brakes or for other reasons, the pendulum will move toward the normal position thereby moving the slide valve to close the port 18 and cut off the release of fluid from the brake cylinder.

In the construction shown in Fig. 1, the arms 45 of the bell cranks 35 on which the weights 46 are mounted, extend in a generally horizontal direction when the pendulum is in the normal position so that when the weights 46 move they move in segments of a circle located adjacent a horizontal plane extending through the axes on which the bell cranks are oscillated.

The force exerted by the weights 46 on the pendulum varies with changes in the position of the bell cranks, and with the form of bell crank shown in Fig. 1 of the drawings, the weight is lifted by the pendulum from an initial position substantially on the horizontal plane of the axis of the bell crank, and as the weight moves away from this position the force exerted by it on the pendulum gradually decreases.

A modified form of construction is shown in Fig. 6 of the drawings in which, when the pendulum is in the normal position, the arms 75 of the bell cranks on which the weights 76 are secured extend above the axes on which the bell cranks are oscillated. With this form of construction the force exerted by either of the weights 76 and opposing movement of the pendulum away from the normal position decreases more rapidly on movement of the pendulum away from the normal position than with the form of construction shown in Fig. 1 of the drawings.

A still different form of construction is shown in Fig. 7 of the drawings in which, when the pendulum is in the normal position, the arms 80 of the bell cranks on which the weights 81 are secured extend below the axes of the bell cranks. With this form of construction the force exerted by either of the weights 81 and opposing movement of the pendulum away from the normal position increases during movement of the pendulum away from the normal position until the weight 81 is lifted above the horizontal center line of the bell crank axis, and on further movement of the weight the force exerted by it and opposing movement of the pendulum decreases.

It will be seen that in each of the three forms of construction shown in the drawings the weights move only a short distance from the horizontal plane extending through the axis of the bell crank supporting the weight and the weight therefore moves in a substantially vertical plane so that the effect of inertia on the weight, which decreases the force exerted by the weight on the pendulum when the weight is in the region below the axis of the bell crank, and which increases the force exerted by the weight on the pendulum when the weight is in the region above the axis of the bell crank will be at a minimum, and is substantially negligible. The force exerted by the weights on the pendulum, therefore, will be substantially that of the force of gravity acting on the weights.

In Fig. 8 of the drawings I have illustrated a different form of inertia-responsive means which I may employ. As shown the inertia-responsive means comprises an arm 99 which corresponds to the arm 25 in the modification shown in Fig. 1 of the drawings. This arm has pivotally secured on the lower end thereof a link 91 which has a roller 92 rotatably secured thereto on a pin 94.

A track indicated generally by the reference numeral 95 on which the roller 92 moves is provided. The track 95 is provided with a central depressed portion indicated at 96 and has portions 97 which incline upwardly from the central portion 96. The portions 97 are substantially straight and rise at a uniform rate and have located outwardly of them curved portions 98 which rise with increasing rapidity as the distance away from the central depressed portion 96 increases.

In the operation of this form of inertia-responsive means the roller 92 normally moves by gravity to the position to which it is shown in Fig. 8. When the vehicle brakes are applied so as to retard the vehicle the roller 92 is caused to move along one of the inclined planes 97. The retardation rate of the vehicle which is effective to cause movement of the roller 92 will be determined by the inclination of the track portion 97, but once the rate of retardation is great enough to start movement of the roller it will move upon the straight incline 97 until it reaches the curved portion 98.

If, when the roller 92 reaches the curved portion 98 the rate of retardation of the vehicle has increased above the rate effective to move the roller along the incline plane 97, the roller will move a distance along the curved plane 98. The point at which the roller stops along the curved plane 98 will depend upon the rate of retardation of the vehicle, the point being farther removed from the straight portion 97, the greater the rate of retardation of the vehicle.

In Fig. 9 of the drawings I have illustrated still another form of inertia-responsive means which I may employ, and as shown in this figure of the drawings, the inertia-responsive means comprises an arm 100 which corresponds to the arm 25 in the modification shown in Fig. 1 of the drawings. The arm 100 terminates in an enlarged end portion 101 which extends into and is slidable in a socket 104 in the weighted body 103 which is provided with wheels 105 adapted to roll upon a substantially horizontal track 107.

In the operation of this form of inertia-responsive means when the vehicle is retarded as a result of an application of the brakes the weighted body 103 moves along the horizontal track and will continue to move until stopped by some means. This may be by means of an abutment on the track 107 (not shown) or by means of a stop associated with the gravity-responsive means which control the arms 100. As the weighted body 103 will continue to move until it is stopped it is possible to use any desired amount of travel for the arm 100 and for the slide valve associated therewith.

While a preferred embodiment and certain modifications of the retardation control apparatus provided by my invention have been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In a vehicle brake system, in combination, brake means, means for effecting an application of the brake means, a member movable according to the rate of retardation of the vehicle, means operated by said member and controlling said brake means, said member having a normal position, and separate means responsive to gravity and unaffected to any appreciable degree by changes in the rate of retardation of the vehicle for opposing movement of said member away from said normal position.

2. In a vehicle brake system, in combination, brake means, means for effecting an application of the brake means, a member movable according to the rate of retardation of the vehicle, means operated by said member and controlling said brake means, said member having a normal position, and separate means responsive to gravity and unaffected to any appreciable degree by changes in the rate of retardation of the vehicle for normally urging said member to said normal position.

3. In a vehicle brake system, in combination, brake means, means for effecting an application of the brake means, a member movable according to the rate of retardation of the vehicle, means operated by said member and controlling said brake means, said member having a normal position, and separate means normally urging said member to said normal position, said means comprising a member responsive to gravity and being unaffected to any appreciable degree in its operation by changes in the rate of retardation of the vehicle.

4. In a vehicle brake system, in combination, brake means, means for effecting an application of the brake means, a member movable according to the rate of retardation of the vehicle, means operated by said member and controlling said brake means, said member having a normal position, and means independent of said member for opposing movement of said member away from said normal position, said means comprising a member responsive to gravity.

5. In a vehicle brake system, in combination, brake means, means for effecting an application of the brake means, a member responsive to inertia and movable in a generally horizontal direction, means operated by said member and controlling said brake means, said member having a normal position, and separate means opposing movement of said member away from said normal position, said means comprising a member responsive to gravity and movable in a substantially vertical plane, whereby said member is unaffected to any appreciable degree in its operation by changes in the rate of retardation of the vehicle.

6. In a vehicle brake system, in combination, brake means, means for effecting an application of the brake means, a member movable according to the rate of retardation of the vehicle, means operated by said member and controlling said brake means, said member having a normal position, and means independent of said member for opposing movement of said member away from said normal position, said means comprising a member responsive to gravity and movable in a generally vertical plane, whereby said member is unaffected to any appreciable degree in its operation by changes in the rate of retardation of the vehicle.

7. In a vehicle brake system, in combination, brake means, means for effecting an application of the brake means, a member movable in a generally horizontal plane in accordance with the rate of retardation of the vehicle, said member controlling said brake means, said member having a normal position, and means opposing movement of said member away from said normal position, said means comprising an arm pivotally supported and having a weighted body associated therewith, said body being subject to gravity and urging said arm to rotate in one direction, the arm being operatively connected with the movable member so that movement of the movable member away from the normal position effects movement of the arm in the opposite direction.

8. In a vehicle brake system, in combination, brake means, means for effecting an application of the brake means, a member movable according to the rate of retardation of the vehicle for controlling said brake means, said member having a normal position, means responsive to gravity and urging said movable member to move in one direction, and means to control the operation of said gravity responsive means whereby said means is inoperable to move the movable member beyond the normal position.

9. In a vehicle brake system, in combination, brake means, means for effecting an application of the brake means, a member movable according to the rate of retardation of the vehicle for controlling said brake means, said member having a normal position, means responsive to gravity and urging said movable member to move in one direction, and means responsive to gravity and urging said movable member to move in the opposite direction, each of said gravity responsive means having means associated therewith and controlling its operation whereby said gravity responsive means is inoperable to move the movable member beyond the normal position.

10. In a vehicle braking system, in combination, a brake cylinder, a slide valve, a seat for said slide valve having a port therein communicating with the brake cylinder, a member movable in accordance with the rate of retardation of the vehicle, the slide valve being movable in accordance with movement of said member and being adapted on movement in one direction to open communication through said port, the port increasing its width from a point adjacent one end thereof to a point spaced therefrom, whereby the area of the port uncovered by the slide valve increases at a faster rate than the rate of movement of the slide valve.

11. In a vehicle braking system, in combination, a brake cylinder, a slide valve, a seat for said slide valve having ports therein communicating with the brake cylinder, a member movable in accordance with the rate of retardation of the vehicle, the slide valve being movable in accordance with movement of said member and being adapted on movement in one direction to open communication through said port, the port having portions of unequal width whereby the area of the opening through the port uncovered by the slide valve varies at a rate different than the rate of movement of the slide valve.

12. In a vehicle brake system, in combination, brake means, means for effecting an application of the brake means, a member movable according to the rate of retardation of the vehicle, means operated by said member for controlling said brake means, means responsive to gravity and independent of said movable member for controlling said movable member, means normally opposing movement of the means responsive to gravity, and means operable when effecting an application of the brakes for rendering said last-named means ineffective.

13. In a vehicle brake system, in combination, brake means, means for effecting an application of the brake means, a member movable according to the rate of retardation of the vehicle, means operated by said member and controlling said brake means, said member having a normal position, means for opposing movement of said member away from its normal position, means operative upon applying the brakes for rendering said means ineffective to oppose movement of said member from its normal position, and means responsive to gravity for opposing movement of said member away from the normal position.

JOSEPH C. McCUNE.